US011047518B2

(12) United States Patent
Neundorf (10) Patent No.: US 11,047,518 B2
(45) Date of Patent: Jun. 29, 2021

(54) QUICK RELEASE ADAPTER FOR DEVICES

(71) Applicant: FARO Technologies, Inc., Lake Mary, FL (US)

(72) Inventor: Christoph Neundorf, Langewiesen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 523 days.

(21) Appl. No.: 15/901,213

(22) Filed: Feb. 21, 2018

(65) Prior Publication Data

US 2018/0299061 A1 Oct. 18, 2018

Related U.S. Application Data

(60) Provisional application No. 62/486,101, filed on Apr. 17, 2017.

(51) Int. Cl.
*F16M 11/04* (2006.01)
*G03B 17/56* (2021.01)
(Continued)

(52) U.S. Cl.
CPC ........... *F16M 11/041* (2013.01); *F16M 11/08* (2013.01); *G01S 7/4813* (2013.01);
(Continued)

(58) Field of Classification Search
CPC .... F16M 11/041; F16M 11/08; G01S 7/4813; G03B 17/561
See application file for complete search history.

(56) References Cited

U.S. PATENT DOCUMENTS 4,696,633 A * 9/1987 Lenk ...................... D01D 4/06
264/176.1
6,234,690 B1 5/2001 Lemieux
(Continued)

FOREIGN PATENT DOCUMENTS

DE 202006004049 U1 6/2006
DE 102010032726 B3 11/2011
(Continued)

OTHER PUBLICATIONS

Extended European Search Report for Application No. 18167599.2 dated Oct. 5, 2018; 7 pgs.

*Primary Examiner* — Eric L Bolda
(74) *Attorney, Agent, or Firm* — Cantor Colburn LLP (57) ABSTRACT

A mounting system for devices such as metrology devices, cameras and video cameras is provided. The mounting system includes a device having a base and a fixture. A mounting assembly is disposed between the fixture and the base, the mounting assembly having a base adapter coupled to the fixture and a nut member rotationally coupled to the base. The nut member further having an inner surface with a plurality of threaded segments thereon, the threaded segments defining first gaps therebetween. The adapter base includes a plurality of threaded portions on an outer surface, the threaded portions defining second gaps therebetween, wherein the threaded portions are sized to be received within the first gaps when the laser scanner is positioned on the fixture and the threaded portions engage the threaded segments when the nut member is rotated.

10 Claims, 11 Drawing Sheets

(51) Int. Cl.
  *G01S 7/481*  (2006.01)
  *F16M 11/08*  (2006.01)
  *F16B 7/20*  (2006.01)

(52) U.S. Cl.
  CPC .............. *G03B 17/561* (2013.01); *F16B 7/20* (2013.01); *F16M 2200/022* (2013.01)

(56) References Cited

U.S. PATENT DOCUMENTS

| | | |
|---|---|---|
| 7,185,862 B1 | 3/2007 | Yang |
| 8,075,203 B2 | 12/2011 | Johnson |
| 8,705,016 B2 | 4/2014 | Schumann et al. |
| 10,316,482 B2 * | 6/2019 | Hoekstra ................. G01N 33/24 |
| 2018/0004170 A1 * | 1/2018 | Ko .......................... G05B 11/01 |
| 2018/0367713 A1 * | 12/2018 | Gilbert ................... F16M 11/14 |
| 2020/0209394 A1 * | 7/2020 | Mark ..................... G01S 7/4813 |

FOREIGN PATENT DOCUMENTS

| | | |
|---|---|---|
| DE | 102011013101 A1 | 9/2012 |
| EP | 0167499 A2 | 1/1986 |
| EP | 1160499 A1 | 12/2001 |
| JP | H04102799 A | 4/1992 |
| WO | 2011023511 A1 | 3/2011 |

\* cited by examiner

QUICK RELEASE ADAPTER FOR DEVICES

CROSS-REFERENCE TO RELATED APPLICATIONS

The present application is a Nonprovisional application of U.S. Provisional Application Ser. No. 62/486,101 filed on Apr. 17, 2017, the contents of which is incorporated by reference herein in its entirety.

BACKGROUND

The subject matter disclosed herein relates to a mounting assembly for coupling a device, such as a metrology device, a camera or a video camera to a fixture, such as a tripod. In particular, the subject matter disclosed herein relates to a mounting assembly that allows a user to quickly mount and dismount the device to the fixture.

Devices, such as cameras or metrology devices are commonly mounted on a fixture, such as a tripod or a gimbal for example. These devices often are either too heavy to hold by hand for extended periods of time, or need to be maintained securely in a position during operation. For example, it may be desired to hold a video camera in a relatively stable position to avoid decreasing the quality of the images being filmed (e.g. camera shake). In the case of metrology devices, such as time-of-flight laser scanners for example, it may be desirable to maintain the base of the laser scanner in a fixed position as measurements are being made.

Typical camera mounts have an adapter that couples to the bottom of the camera body, such as with a bolt for example. The adapter includes rails that engage grooves on a mounting plate of the tripod. To mount or dismount the camera, the user slides the rails into the grooves. The adapter is then secured to the mounting plate by a latching mechanism when the rails are fully engages in the grooves.

In other instances, such as where a secure and reliable mount is desired, the camera or metrology device may be directly coupled to the tripod by fasteners, such as bolts. It should be appreciated that while this provides a secure connection, the assembly and disassembly of the device from the tripod may be time consuming and require additional tools.

Accordingly, while existing mounting systems for devices to fixtures are suitable for their intended purposes, what is needed is a mounting arrangement having certain features of embodiments of the present invention.

SUMMARY

In accordance with an embodiment of the invention, a mounting system is provided. The mounting system includes a device having a base and a fixture. A mounting assembly is disposed between the fixture and the base, the mounting assembly having a base adapter coupled to the fixture and a nut member rotationally coupled to the base. The nut member further having an inner surface with a plurality of threaded segments thereon, the threaded segments defining first gaps therebetween. The adapter base includes a plurality of threaded portions on an outer surface, the threaded portions defining second gaps therebetween, wherein the threaded portions are sized to be received within the first gaps when the laser scanner is positioned on the fixture and the threaded portions engage the threaded segments when the nut member is rotated.

In accordance with another embodiment of the invention, a three-dimensional (3D) measurement system is provided. The 3D measurement system includes a laser scanner a fixture and a mounting assembly. The laser scanner includes a measurement head adapted to be rotated about an axis extending through a base, the laser scanner having a transmitter and a receiver, the transmitter arranged in the measuring head for transmitting a light beam, the receiver arranged in the receiving head for receiving a light beam reflected by an object in an environment. The mounting assembly is disposed between the fixture and the base, the mounting assembly having a base adapter coupled to the fixture and a nut member rotationally coupled to the base, the nut member having an inner surface with a plurality of threaded segments thereon, the threaded segments defining first gaps therebetween, the adapter base having a plurality of threaded portions on an outer surface, the threaded portions defining second gaps therebetween, wherein the threaded portions are sized to be received within the first gaps when the laser scanner is positioned on the fixture and the threaded portions engage the threaded segments when the nut member is rotated.

In accordance with still another embodiment of the invention, a three-dimensional (3D) measurement system is provided. The 3D measurement system includes a laser scanner, a fixture and a mounting assembly. The laser scanner includes a measurement head adapted to be rotated about an axis extending through a base, the laser scanner having a transmitter and a receiver, the transmitter arranged in the measuring head for transmitting a light beam, the receiver arranged in the receiving head for receiving a light beam reflected by an object in an environment. The mounting assembly is disposed between the fixture and the base. The mounting assembly further includes a base adapter coupled to the fixture, the base adapter having a counter-bore on one end, the base adapter further having a plurality of threaded portions arranged equidistantly about a circumference of an outer surface. A mounting plate is provided having a body sized to be at least partially disposed within the counter-bore when the laser scanner is mounted to the fixture, the mounting plate having an interior area defined by a conical surface, the mounting plate having a central opening extending therethough. A fastener is rotationally coupled to the mounting plate and at least partially extending through the central opening, the fastener configured to couple to the base. A nut member is provided having an inner surface with a plurality of threaded segments thereon, the inner surface defining a hollow interior sized to at least partially receive the mounting plate and the base adapter, the threaded segments defining a gap therebetween sized to receive the threaded portions, the threaded segments being sized and positioned to engage the threaded segments when nut member is rotated relative to the base adapter. A clamping plate is disposed on an end of the nut member opposite the mounting plate, the clamping plate being coupled to the mounting plate.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The technical solutions described herein generally relate to a mounting arrangement that allows a device, such as a camera, video camera or metrology device to be quickly and easily mounted to a fixture, such as a tripod.

It should be appreciated that in operation a device, such as a laser scanner 20 (FIG. 11) or a camera for example, may be mounted to a structure or fixture to securely hold the device and to reduce or prevent relative movement of the devices base during operation. In an embodiment, the device is mounted to a fixture, such as a tripod 198 (FIG. 16). In an embodiment where the device is a laser scanner, the tripod 198 holds the laser scanner 20 stable as a carrying structure 42 rotates about a base 24. In the exemplary embodiment, a quick mounting assembly 200 is provided that allows an operator to quickly, reliably and securely mount the laser scanner 20 to the fixture 198.

Referring now to FIGS. 1-7, an embodiment is shown of a quick mounting assembly 200 that allows a device, such as a camera or the laser scanner 20 to be easily and quickly mounted to the fixture 198. The quick mounting assembly 200 includes a nut member 202 having a generally cylindrical body 204 having a knurled outer wall 206. The outer wall 206 includes at least one opening 214 extending therethrough. As will be discussed in more detail herein, the opening 214 is sized to receive a tool (such as an Allen key for example) to assist the operator in mounting the nut member 202 to the laser scanner 20.

Figure 8:
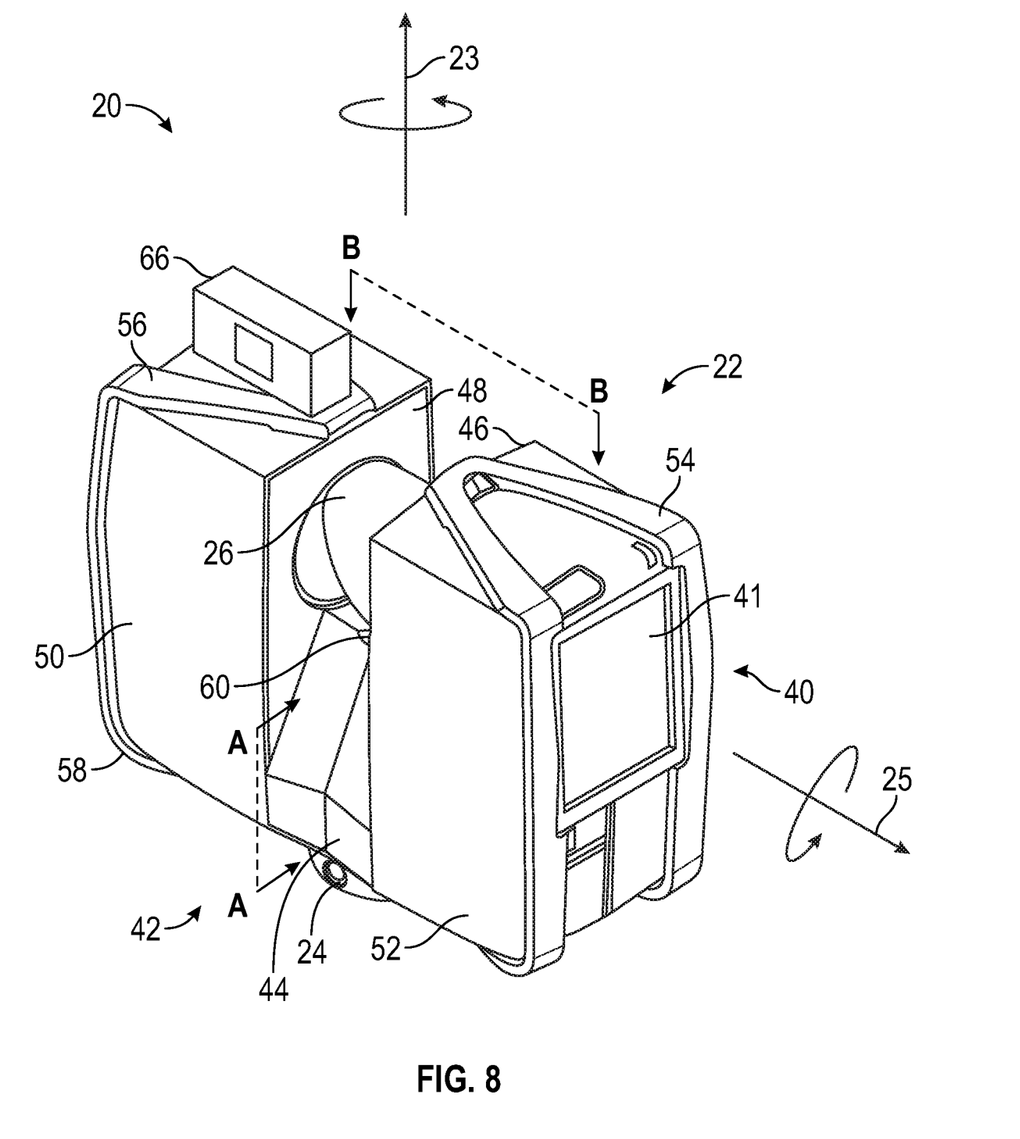
FIG. 8 illustrates a perspective view of a laser scanner in accordance with an embodiment of the invention.
Figure 9:
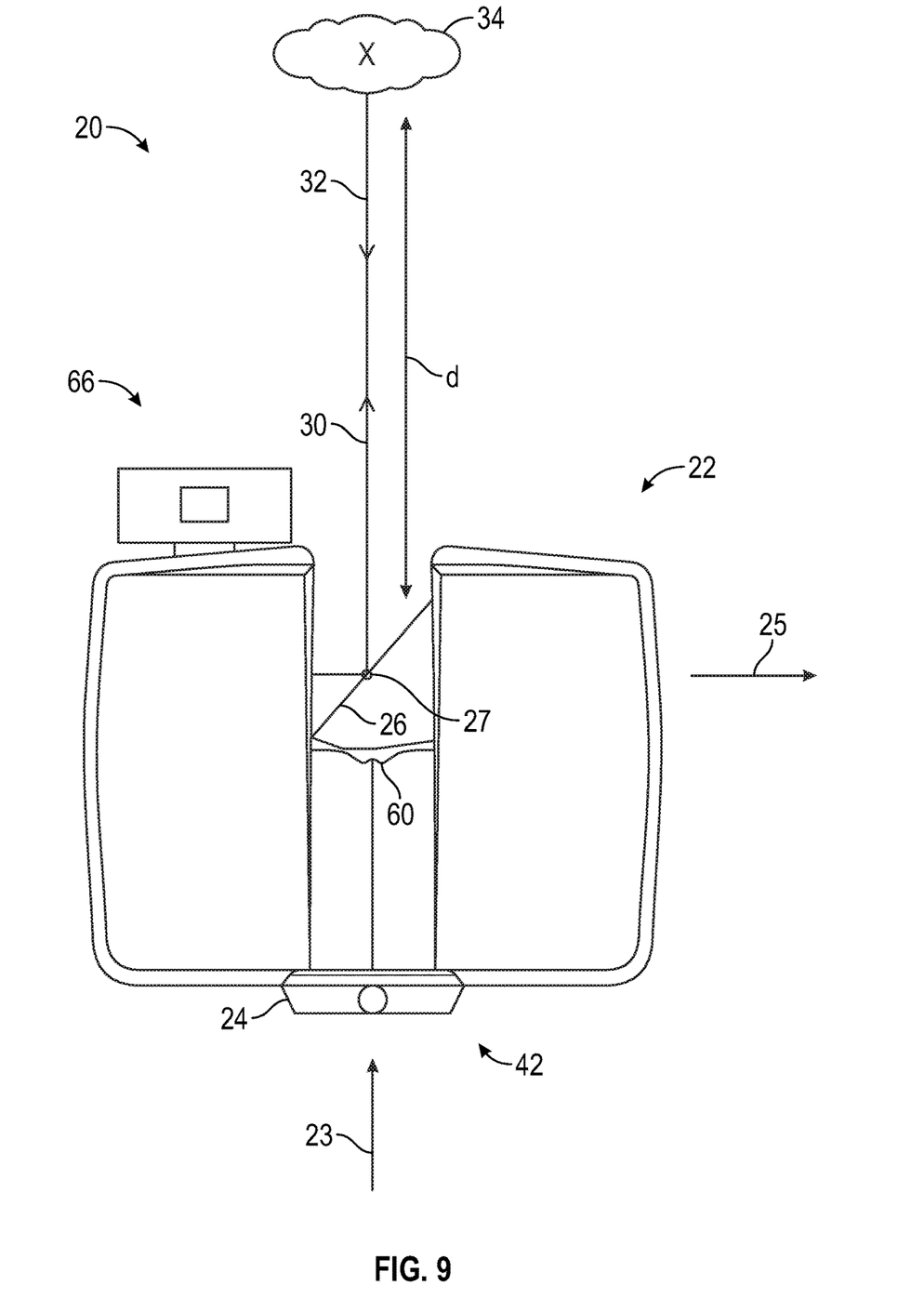
FIG. 9 illustrates a side view of the laser scanner illustrating a method of measurement.

A top end 208 of the nut member 202 includes a first recess 210 and a second recess 212. The second recess 212 defines an opening 213 that extends therethrough. In an embodiment, the number 202 includes only the first recess 210. In an embodiment, the first recess 202 is sized to receive a clamping disc 216. The outer wall 206 has an inner surface 220 that defines a hollow interior 218 (FIG. 8-9). Formed on the inner surface 220 are a plurality of equal thread segments 222. In the illustrated embodiment, there are three thread segments 222 equally spaced and made about the circumference of the inner surface 220. The thread segments 222 define a gap 224 therebetween. In an embodiment, the thread segments define a bayonet thread that engages threads on an adapter base 226 to clamp the laser scanner 20 or camera into the fixture 198. In an embodiment, a surface 228 encloses the end of the hollow interior 218.

Disposed within the second recess 212 is the clamping disc 216. The clamping disc 216 is a generally thin cylindrical member having a plurality of openings 230 sized to receive fasteners 232. In the illustrated embodiment, the openings include a countersink that allow the top of the fasteners 232 to be flush or below a top surface 234 of the clamping disc 216. The clamping disc 216 includes a central opening 233.

Figure 2:
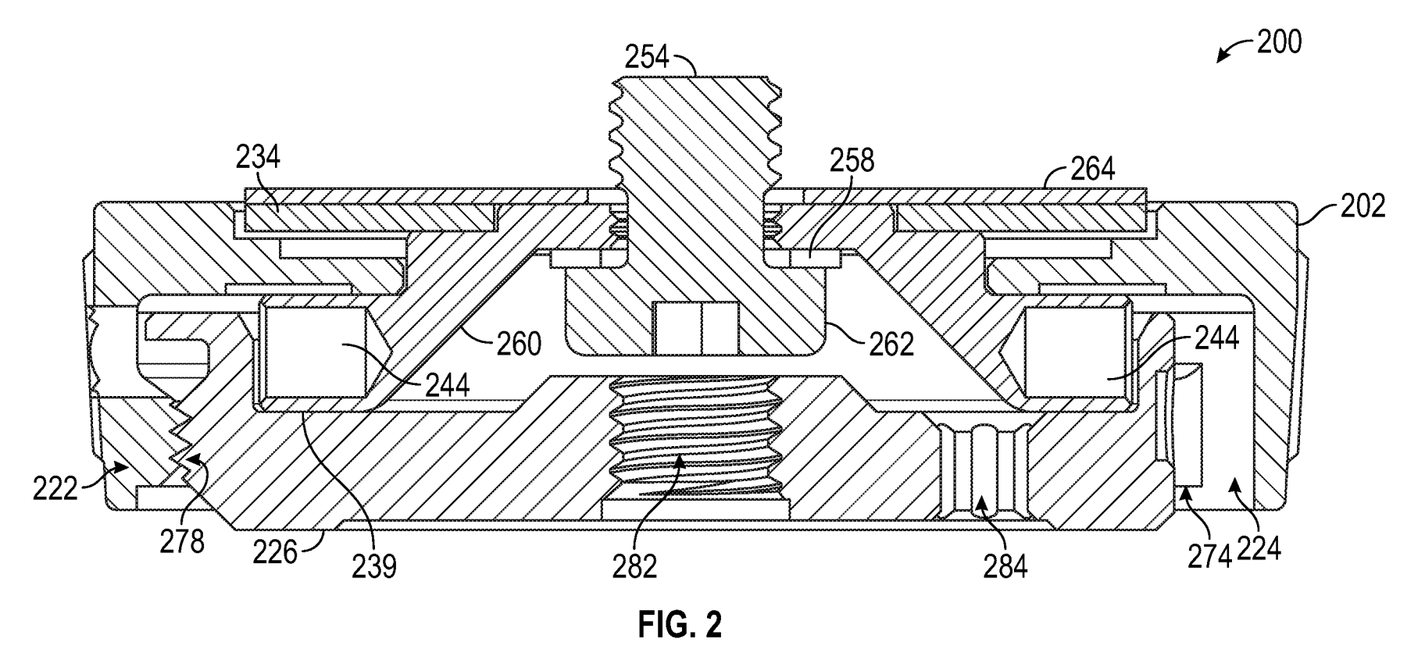
FIG. 2 illustrates a sectional view of the quick mount assembly of FIG. 4.
Figure 3:
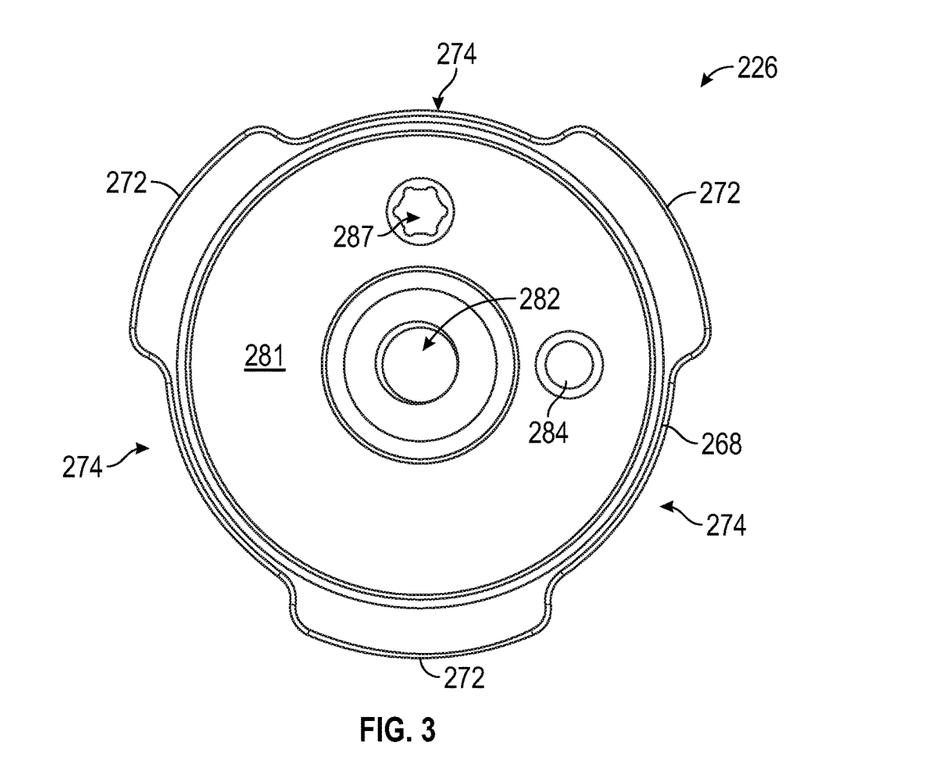
FIG. 3 illustrates a top view of an adapter base for the quick mount assembly of FIG. 4 according to an embodiment.
Figure 11:
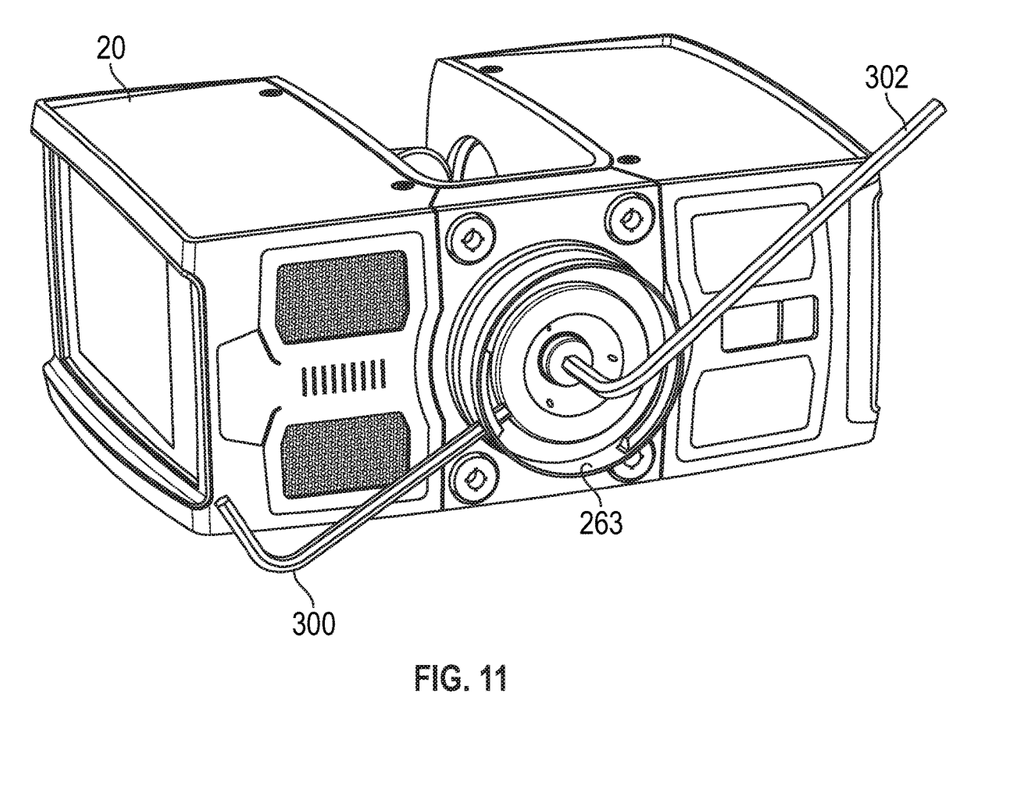
FIG. 11 illustrates an installation of the nut assembly to the laser scanner according to an embodiment of the invention.

The fasteners 232 extend through the clamping disc 234 and the opening 213 to engage threaded openings 236 in a mounting plate 238. The mounting plate 238 has a body 240 with a generally cylindrical outer surface 242. At least one hole 244 extends through the outer surface 242. In the illustrated embodiment, the mounting plate includes a plurality of holes 244 disposed equidistant about the circumference of the outer surface 242. The holes 244 are positioned to be substantially co-axial with the openings 214 and are sized to receive a tool (FIG. 11). In an embodiment, the holes 244 are blind holes (FIG. 2). The mounting plate 238 includes a first projection 246 that extends from an end surface 248. The first projection 246 is sized to be received within the opening 213 of nut member 202. In the illustrated embodiment, the threaded openings 236 are disposed in an end surface of the first projection 246. A second projection 250 extends from the first projection 246 and includes a central opening 252. The second projection 250 is sized to be received within the opening 233. In an embodiment, the central opening 252 includes threads that are sized to engage threads on a fastener 254. A washer 258 may be disposed between the fastener 254 and the mounting plate 238. In an embodiment, the fastener 254 includes a relief portion 256 that is sized to allow the threads of the fastener 254 to pass completely through the opening 252 allowing the mounting plate 238 to rotate independently from the fastener 254. The body 240 defines an interior region having a conical surface 260 (FIG. 2) that is sized to receive the head 262 of the fastener 254.

Figure 7:
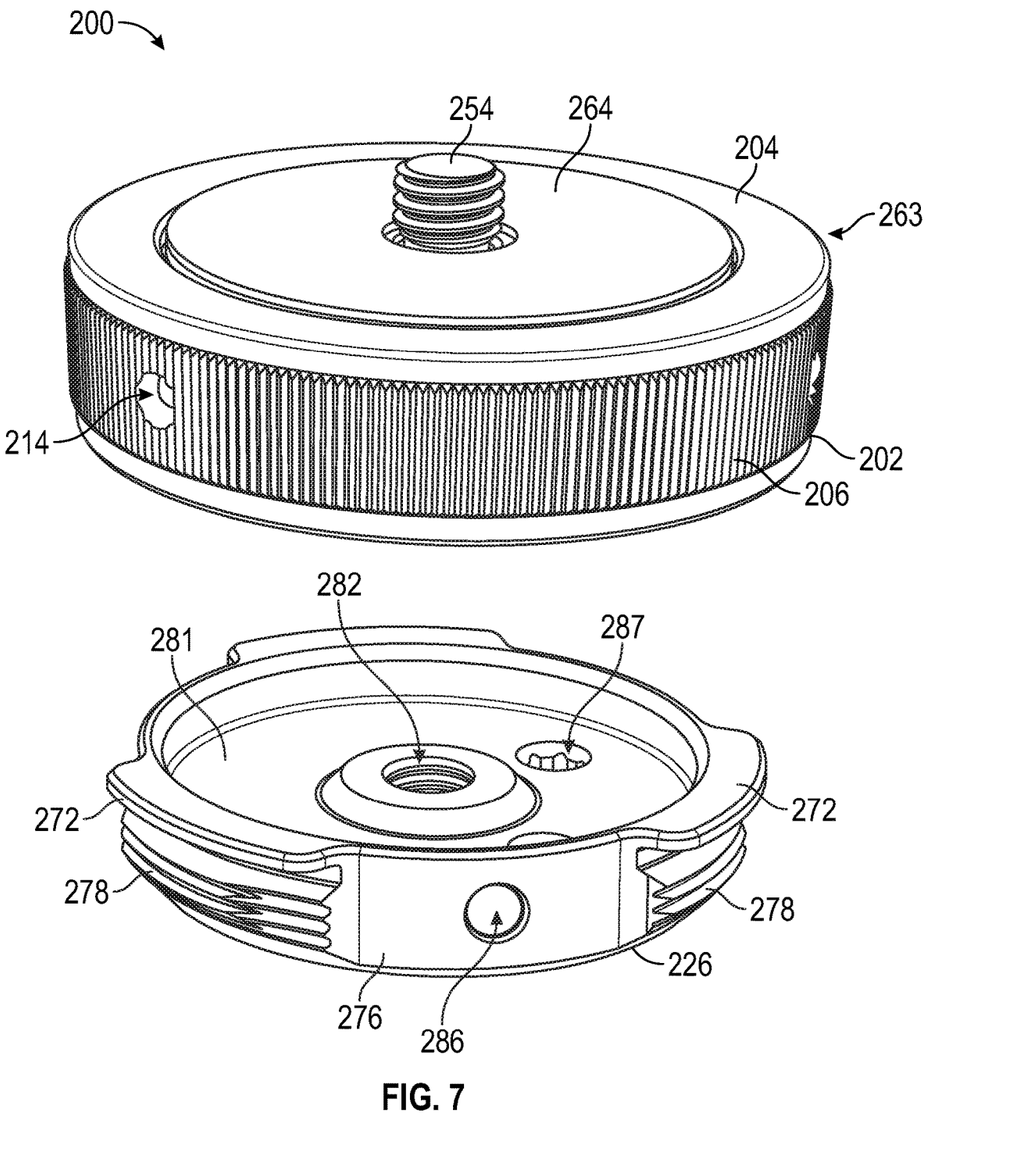
FIG. 7 illustrates a disassembled view of the quick mount assembly of FIG. 4.

The clamping disc 216 is coupled to the mounting plate 238 with fasteners 232 with the nut member 202 clamped therebetween to define a nut assembly 263 (FIG. 7). As will be discussed in more detail below, a pad member 264 is disposed on the surface 234 and the fastener 254 engages a threaded opening (not shown) in the laser scanner 20. In the illustrated embodiment, the pad member 264 includes an opening 266 sized to allow the fastener 254 to pass therethrough. The pad member 264 may be made from an elastomeric material, such as rubber for example, to protect the surface of the laser scanner 20 where the nut assembly 263 is mounted.

The quick mounting assembly 200 further includes an adapter base 226. The adapter base 226 includes a body 268 having an end 270 that includes a plurality of radially extending tabs 272. The tabs 272 cooperate to define gaps 274. In the illustrated embodiment, the gaps 274 are sized to allow the threaded segments 222 to pass therethrough when the adapter base 226 is inserted into the hollow interior 218. The body 268 further includes an outer wall 276 having at least one threaded portion 278. In an embodiment, the body 268 includes three threaded portions 278 that extend from the outer wall 276 are arranged to engage the threaded segments 222 when the adapter base 226 is inserted into the hollow interior 218 and the nut member 202 is rotated. In an embodiment, the threaded portions 278 are axially aligned with the tabs 272.

Figure 4:
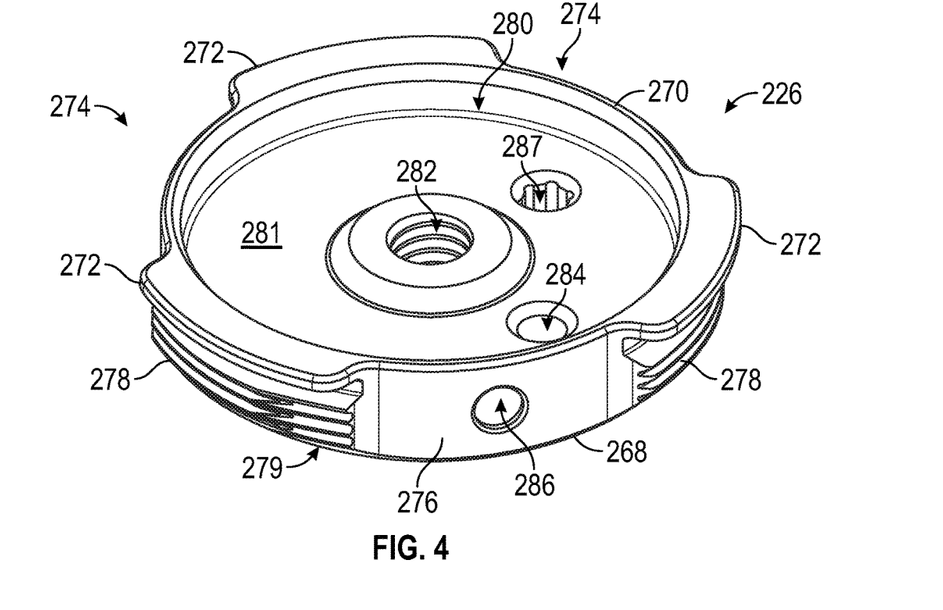
FIG. 4 illustrates a perspective view of the adapter base of FIG. 6.
Figure 5:
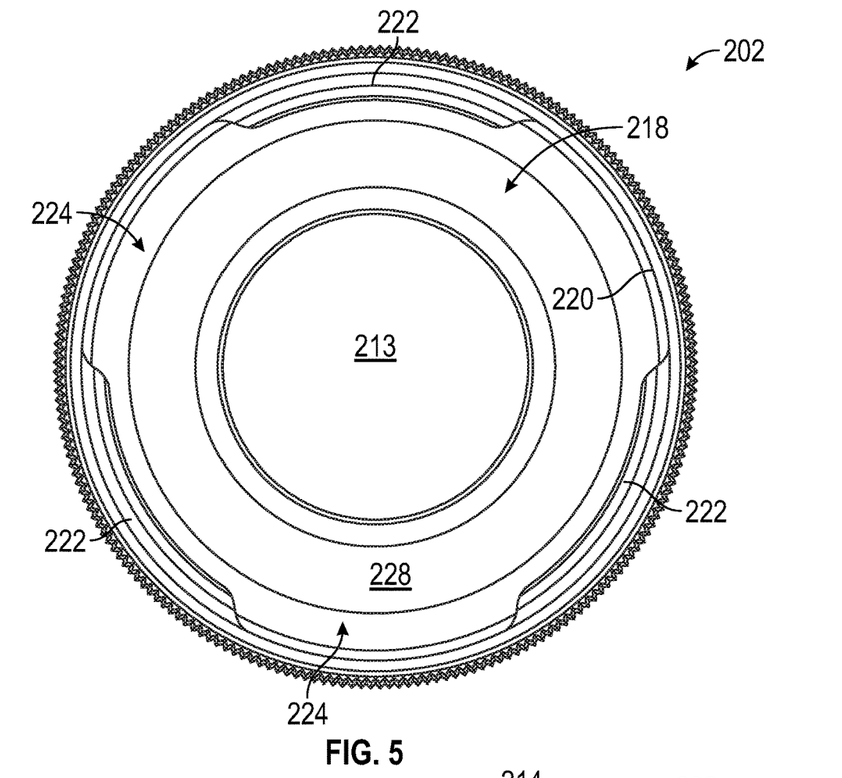
FIG. 5 illustrates a bottom view of a nut member for the quick mount assembly of FIG. 4 according to an embodiment.
Figure 6:
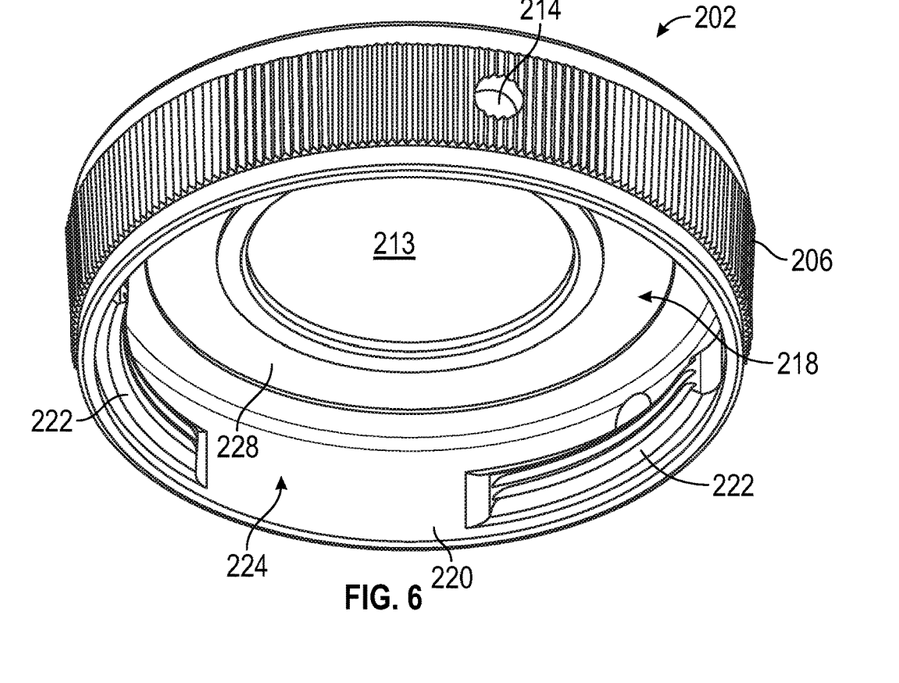
FIG. 6 illustrates a bottom perspective view of the nut member of FIG. 8.

In the illustrated embodiment, each of the thread portions 278 includes a plurality of recesses 279 (FIG. 4). Each of the recesses 279 is aligned with one of the threads in the thread portions 278. These recesses 279 provide advantages in avoiding the lifting of the nut member 202 before being able to tighten it. The recesses 279 allow the internal thread segments 222 to smoothly enter and engage the thread portions 278. It should be appreciated that the device (e.g. a metrology device, camera or video camera) are freely rotatable prior to tightening the nut member 202.

The body 268 includes a counter-bore 280 that extends from the end 270. A threaded opening 282 extends from the center of the counter-bore 280 through the body 268. The threaded opening 282 is sized and configured to engage a fastener (not shown) on the fixture 198. In an embodiment, the counter-bore 280 includes one or more openings 284 on a bottom surface 281 that are sized to receive set screws that secure the adapter base 226 to the fixture 198. In an embodiment, an opening 287 (hex shape) is arranged on the bottom surface 281 and is sized to receive a tool to tighten the adapter base 226 onto the fixture 198. In an embodiment, an outer wall 276 is arranged to provide a visual indicator or marker that facilitates the user correctly aligning the nut assembly 263 relative to the adapter base 226 during assembly. When oriented with the outer wall 276 and the openings 214 aligned, the tabs 272 will pass through the gaps 224.

Figure 10:
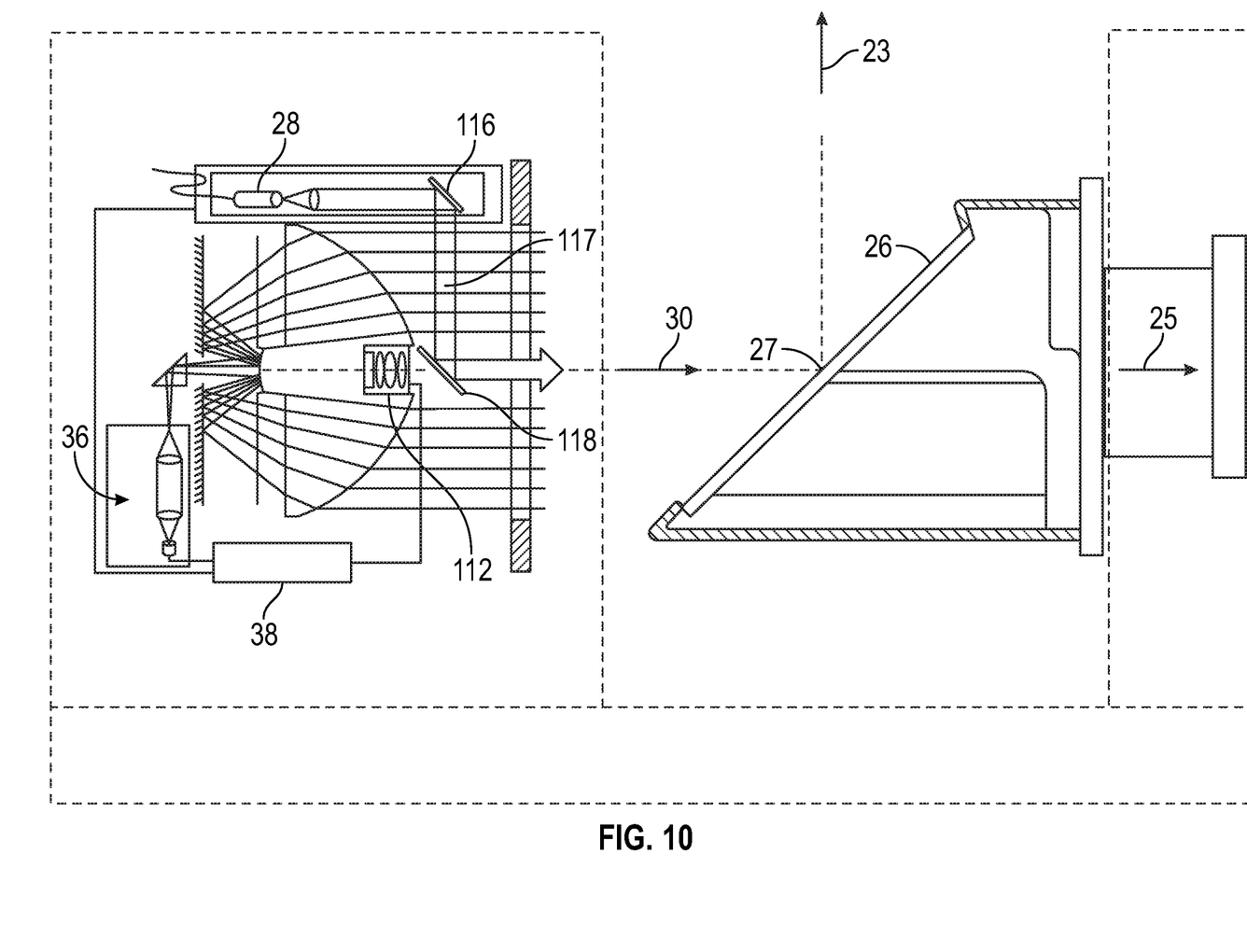
FIG. 10 is a schematic illustration of the optical, mechanical, and electrical components of the laser scanner.

Referring now to FIGS. 8-10, a metrology device 20, such as a laser scanner, is shown for optically scanning and measuring the environment surrounding the laser scanner 20. As discussed herein, the laser scanner 20 is typically mounted to a fixture to secure the laser scanner 20 in position during operation. The laser scanner may be the same as that described in commonly owned U.S. Pat. No. 8,705,016, the contents of which are incorporated herein by reference. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side, upside down, or on an angle, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 may be amplitude or intensity modulated, for example, with a sinusoidal waveform or with a rectangular waveform. The emitted light beam 30 is emitted by the light emitter 28 onto the rotary mirror 26, where it is deflected to the environment.

A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25, 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 about axis 25 relatively quickly while rotating the measuring head 22 about axis 23 relatively slowly, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system. As discussed in more detail herein, the base 24 may be mounted to a fixture, such as a tripod for example, by a quick mounting assembly.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

Figure 1:
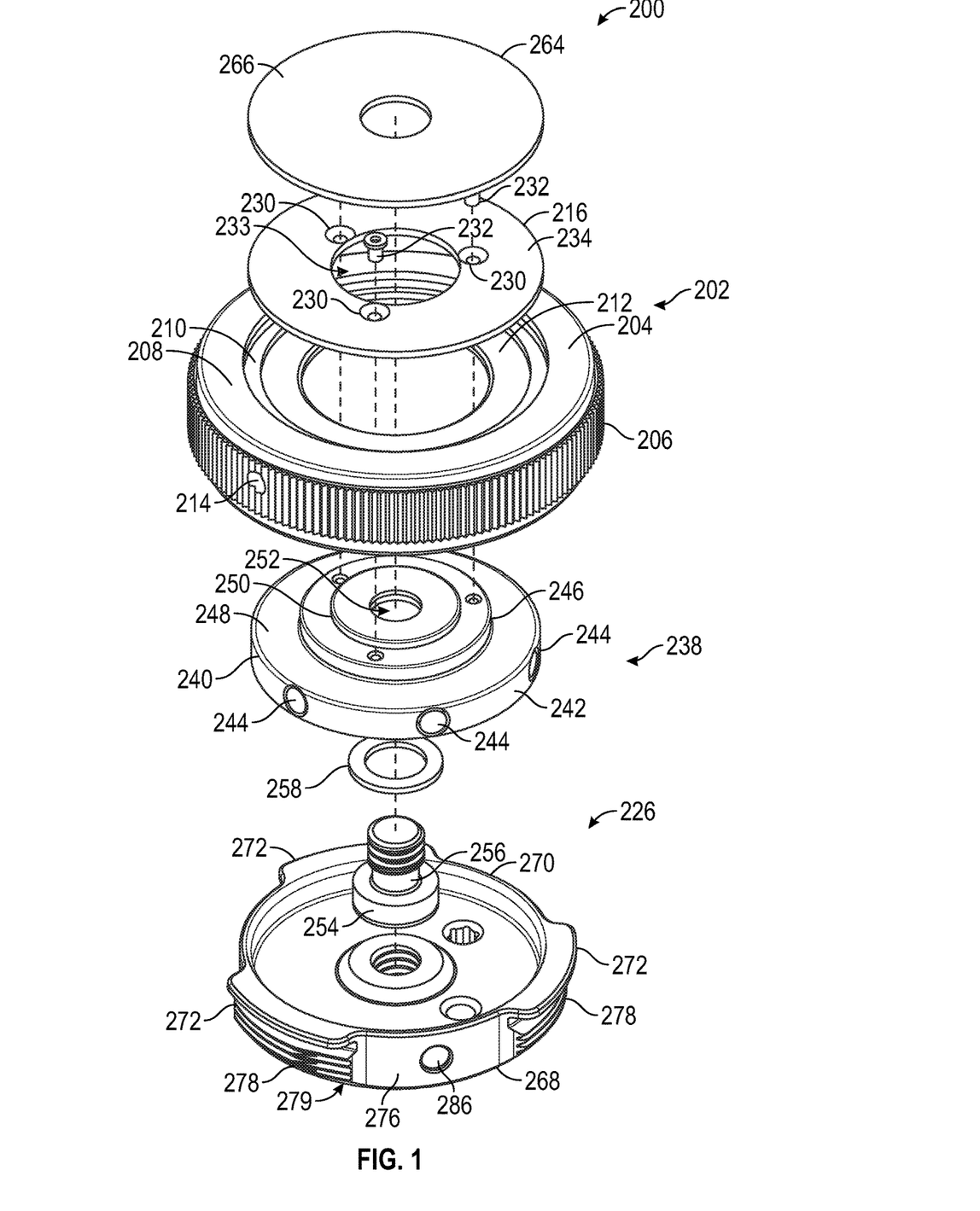
FIG. 1 illustrates an exploded view of a quick mount assembly according to an embodiment.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

In an embodiment, on an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 54. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor that is configured to rotate the measuring head 22 about the axis 23.

In an embodiment, an auxiliary image acquisition device 66 may be coupled to the carrying structure 42. The auxiliary image acquisition device 66 may be a device that captures and measures a parameter associated with the scanned volume or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector for example.

In an embodiment, a camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 takes 2D photographic images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 12:
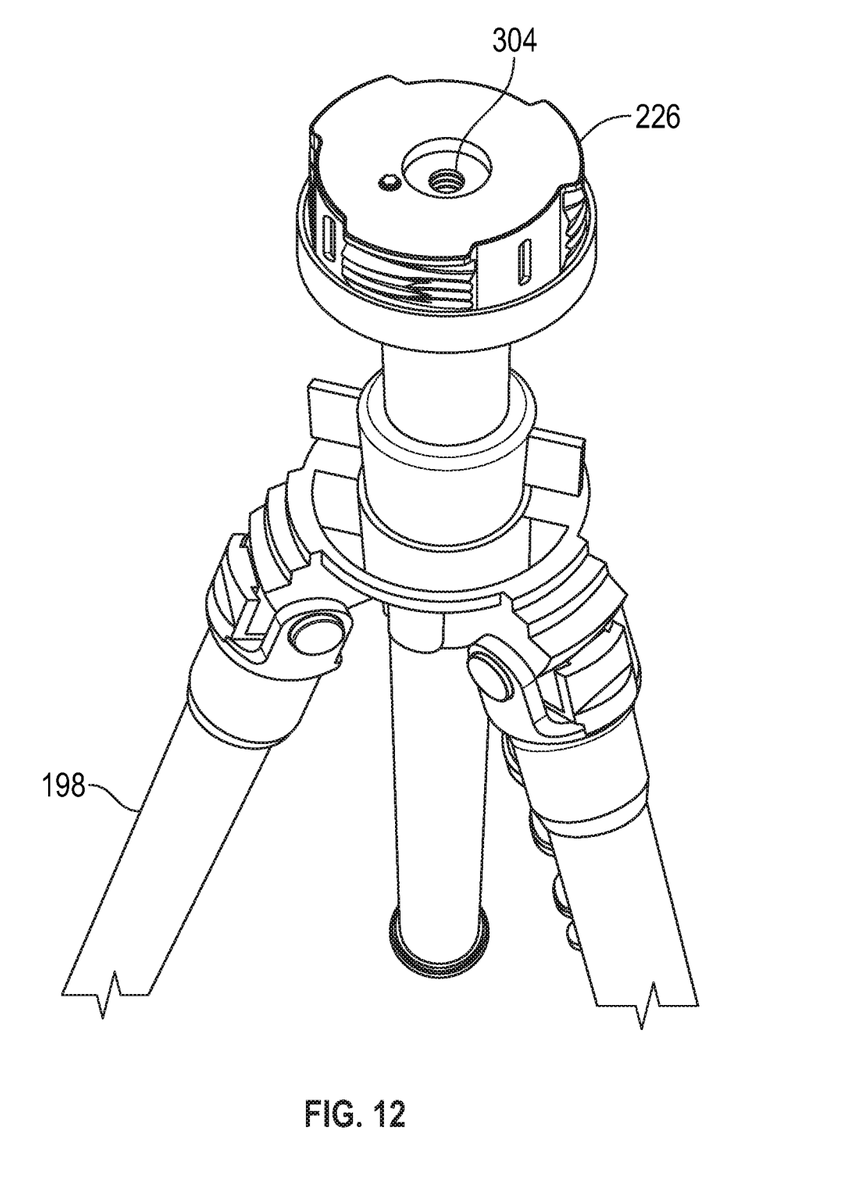
FIG. 12 illustrates the adapter base coupled to a tripod type fixture according to an embodiment.
Figure 13:
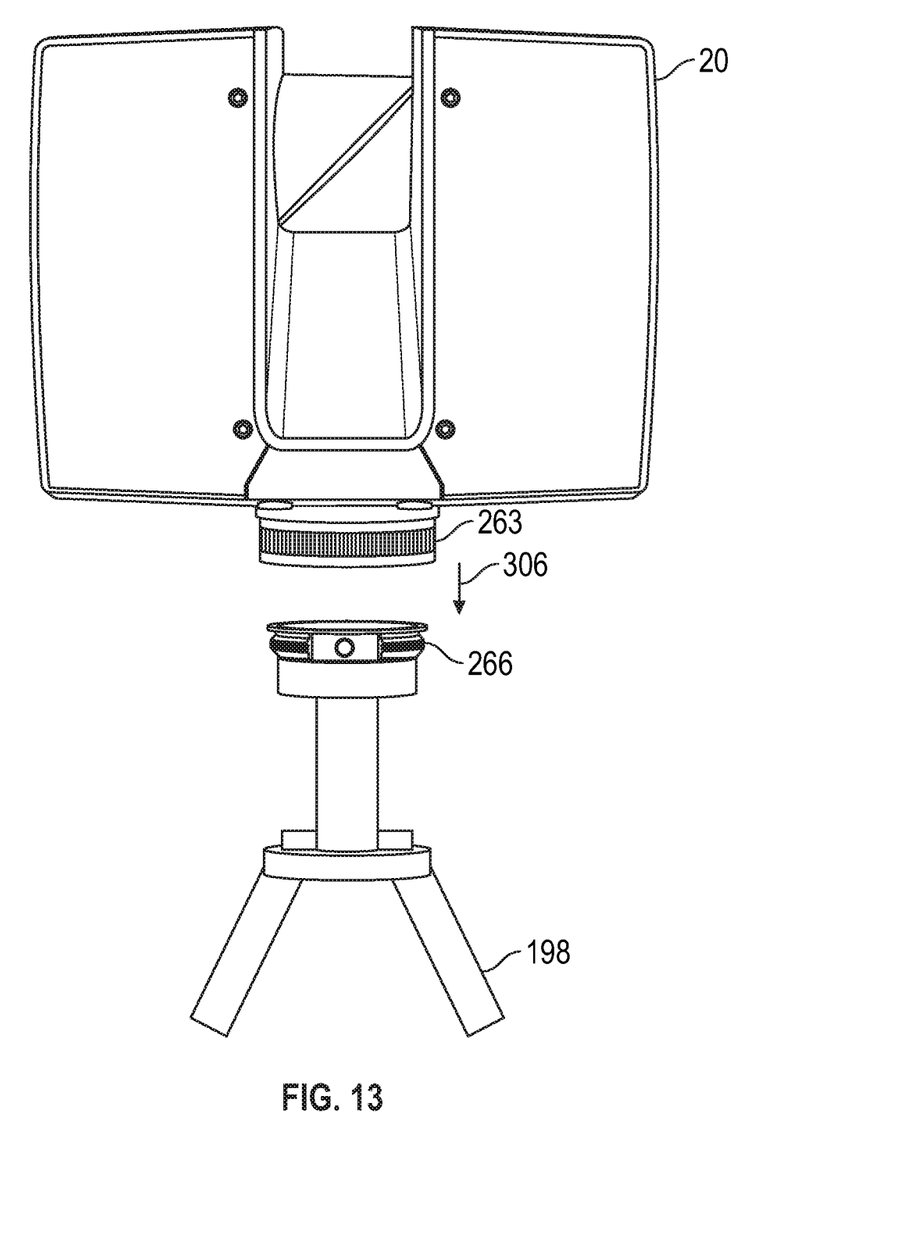
FIG. 13 illustrates the mounting of the laser scanner to the tripod fixture according to an embodiment.

Referring now to FIGS. 11-13 a method is shown for installing the quick mounting assembly 200 to the laser scanner 20 and the fixture 198. First the nut assembly 263 is installed on the base 24 of laser scanner 20. In an embodiment, a tool 300 is inserted into the openings 214, 244 to provide leverage to the operator in holding the nut assembly 263. Then a second tool 302 engages the fastener 254 and the nut assembly 263 is coupled to the laser scanner 20. Similarly, the base adapter 226 is coupled to the fixture 198 by engaging a threaded member 304 on the fixture to the opening 282.

The laser scanner 20 is then positioned over the fixture 198 as shown in FIG. 13 with the tabs 272 aligned with the gaps 224. The laser scanner 20 is then moved in the direction of arrow 306 to insert the adapter base 226 into the hollow interior 218 of nut member 202. The threaded segments 222 and the threaded portions 278 are positioned and configured to engage each other when the nut assembly 236 is rotated. The engagement of the threaded segments 222 and the threaded portions 278 and the rotation of the nut assembly 236 pulls the laser scanner 20 towards the fixture 198 causing a bottom surface 239 (FIG. 5) of the mounting plate 238 into contact with the surface 281 of the adapter base 226 to clamp the nut assembly 263 onto the adapter base 226. It should be appreciated that a relatively small rotation (~¼ turn) of the nut assembly 263 provides sufficient clamping force to securely and reliably couple the laser scanner 20 to the fixture 198.

It should be appreciated that the method illustrated in FIGS. 11-13 may be applied to devices other than laser scanners. In other embodiments, the method of FIGS. 11-13 may be used with cameras, video cameras, surveying equipment, total stations, theodolites, transits, laser trackers and other metrology or measurement devices.

It should be appreciated that embodiments disclosed herein provide advantages in allowing a device to be easily, quickly and reliably coupled to and uncoupled from a fixture. It should be appreciated that while embodiments disclosed herein describe the mounting system being used in connection with a metrology device, such as a laser scanner, this is for exemplary purposes and the claims should not be so limited. In other embodiments, the mounting system may be used with other devices, such as but not limited to cameras, video cameras, surveying equipment, total stations, theodolites, transits, laser trackers and other metrology or measurement devices.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A three-dimensional (3D) measurement system comprising:
   a laser scanner having a measurement head adapted to be rotated about an axis extending through a base, the laser scanner having a transmitter and a receiver, the transmitter arranged in the measuring head for transmitting a light beam, the receiver arranged in the receiving head for receiving a light beam reflected by an object in an environment;
   a fixture; and
   a mounting assembly disposed between the fixture and the base, the mounting assembly having a base adapter coupled to the fixture and a nut member rotationally coupled to the base, the nut member having an inner surface with a plurality of threaded segments thereon, the threaded segments defining first gaps therebetween, the adapter base having a plurality of threaded portions on an outer surface, the threaded portions defining second gaps therebetween, wherein the threaded portions are sized to be received within the first gaps when the laser scanner is positioned on the fixture and the threaded portions engage the threaded segments when the nut member is rotated,
   wherein the base adapter includes a plurality of radially extending tabs, each of the tabs being aligned with one of the threaded portions, and each of the tabs extending radially beyond one of the threaded portions.

2. The 3D measurement system of claim 1, wherein the adapter base further comprises a plurality of recesses, each of the recesses aligned with a respective one of the thread portions.

3. The 3D measurement system of claim 1, further comprising:
   a clamping disc disposed within a recess on a top surface of the nut member; and
   a mounting plate disposed within the hollow interior and coupled to the clamping disc.

4. The 3D measurement system of claim 3, wherein the mounting plate has a first projection extending from a surface and a second projection extending from the first projection, the first projection being sized to be received in an opening in the nut member, the second projection being sized to be received in an opening in the clamping disc.

5. The 3D measurement system of claim 3, wherein a bottom surface of the mounting plate contacts the base adapter when the nut member is rotated to couple the laser scanner to the fixture.

6. The 3D measurement system of claim 1, wherein tabs are sized to be received within the first gaps.

7. The 3D measurement system of claim 1, further comprising a pad member disposed between the nut member and the base.

8. A three-dimensional (3D) measurement system comprising:
   a laser scanner having a measurement head adapted to be rotated about an axis extending through a base, the laser scanner having a transmitter and a receiver, the transmitter arranged in the measuring head for transmitting a light beam, the receiver arranged in the receiving head for receiving a light beam reflected by an object in an environment;
   a fixture; and
   a mounting assembly disposed between the fixture and the base, the mounting assembly comprising:
      a base adapter coupled to the fixture, the base adapter having a counter-bore on one end, the base adapter further having a plurality of threaded portions arranged equidistantly about a circumference of an outer surface, wherein the base adapter includes a plurality of radially extending tabs, each of the tabs being aligned with one of the threaded portions, and each of the tabs extending radially beyond one of the threaded portions;

a mounting plate having a body sized to be at least partially disposed within the counter-bore when the laser scanner is mounted to the fixture, the mounting plate having an interior area defined by a conical surface, the mounting plate having a central opening extending therethough;

a fastener rotationally coupled to the mounting plate and at least partially extending through the central opening, the fastener configured to couple to the base;

a nut member having an inner surface with a plurality of threaded segments thereon, the inner surface defining a hollow interior sized to at least partially receive the mounting plate and the base adapter, the threaded segments defining a gap therebetween sized to receive the threaded portions, the threaded segments being sized and positioned to engage the threaded segments when nut member is rotated relative to the base adapter; and a clamping disc disposed on an end of the nut member opposite the mounting plate, the clamping disc being coupled to the mounting plate.

9. The 3D measurement system of claim 8, further comprising a pad member disposed between the clamping disc and the base.

10. The 3D measurement system of claim 9, wherein the nut member includes a first opening that extends through an outer wall.

* * * * *